United States Patent [19]
Kawiecki

[11] 3,828,290
[45] Aug. 6, 1974

[54] OVERVOLTAGE PROTECTOR HOLDER AND HOUSING

[75] Inventor: Chester J. Kawiecki, Santa Barbara, Calif.

[73] Assignee: Joslyn Mfg. and Supply Co., Chicago, Ill.

[22] Filed: Dec. 20, 1972

[21] Appl. No.: 316,737

[52] U.S. Cl............. 337/186, 337/190, 337/199, 337/206, 337/208
[51] Int. Cl. ............................................. H01h 85/02
[58] Field of Search ............ 317/105, 107, 108, 67; 200/168 R; 337/186, 187, 190, 199, 205, 206, 208, 192, 196; 220/41; 174/138 F, 5 R, 50

[56] References Cited
UNITED STATES PATENTS

| | | | |
|---|---|---|---|
| 1,175,103 | 3/1916 | Williams | 337/192 |
| 1,179,380 | 4/1916 | Parker | 317/67 |
| 2,002,211 | 5/1935 | Torney | 220/41 X |
| 2,665,353 | 1/1954 | Popp | 174/50 X |
| 2,690,947 | 10/1954 | Roehrl | 220/60 R X |
| 3,340,431 | 9/1967 | Wanaselja | 174/138 F |
| 3,699,500 | 10/1972 | Borzoni et al. | 337/196 X |

FOREIGN PATENTS OR APPLICATIONS

| | | | |
|---|---|---|---|
| 595,916 | 10/1925 | France | 174/5 R |
| 630,221 | 10/1961 | Canada | 317/69 |

Primary Examiner—J. D. Miller
Assistant Examiner—Fred E. Bell
Attorney, Agent, or Firm—Klarquist, Sparkman, Campbell, Leigh, Hall & Whinston

[57] ABSTRACT

An overvoltage protection apparatus is described including an improved housing containing the overvoltage protection device and a separate holder member within which such device is secured. The housing includes a cover member and base member of a tapered shape so that the cover member is freed from such base member after it slides along a guide slot only about one-third the length of such base member. A concealed tamper-proof lock means is provided on the top portion of the cover and base member, including a notch and a cooperating lock projection which lock the cover in its closed position. The holder member is a hollow box of transparent plastic insulating material for holding the overvoltage protection device to enable it to be easily inserted into and removed out of engagement with electrical contacts on the base member while reducing the danger of electrical shock.

13 Claims, 6 Drawing Figures

PATENTED AUG 6 1974　　　　　　　　　　　　　　　　3,828,290

OVERVOLTAGE PROTECTOR HOLDER AND HOUSING

BACKGROUND OF THE INVENTION

The subject matter of the present invention relates generally to an overvoltage protection apparatus for protecting electronic circuit equipment, such as telephones, from excessive voltage due to lightning, contact of their conductors by high voltage power lines, or electrical faults of other types. More particularly, the present invention relates to an improved housing and separate holder member for the overvoltage protection device.

The housing of the present invention includes a cover and base member of tapered shape which enables the cover to be freed from the base member after it slides only over a small portion of the length of such base member and thereby requires less mounting space than prior art housing, such as shown in U.S. Pat. No. 3,310,712 of Paddock granted Mar. 21, 1967. In addition, the cover member and the base member are provided with a single lock means including a notch and locking projection at top portions of these members which cooperate to provide a lock means which is more tamper proof than the two locks provided on the opposite sides of the cover of the above-mentioned patent.

The overvoltage device holder of the present invention may be in the form of a hollow rectangular box of transparent plastic insulating material having an open ended bottom and provided with detent projection means for securing the device within such holder. The holder enables easier insertion and removal of the overvoltage protection device into and out of engagement with electrical contacts provided on the base member of the housing, while protecting the repair man from electrical shocks. Previously it has been proposed in U.S. Pat. No. 3,281,625 of O. Wanaselja, granted Oct. 25, 1966, to mount the overvoltage protection device on a spring clip holder attached to the cover by a ground stud so that when the cover is removed, such device is also removed from electrical contacts attached to the base member of the housing to prevent electrical shock. However, unlike the present invention, this prior apparatus does not employ a separate holder member to hold the overvoltage device inside the housing.

The separate holder member of the present invention protects the overvoltage device from damage during handling prior to assembly inside the housing, and after assembly it protects the electrical contacts engaging such device from dust and other foreign matter. In addition, the separate holder member enables the overvoltage protection device to be observed through the transparent plastic wall of the holder member, while such device remains mounted on its electrical contacts and without interrupting service. Of somewhat lesser importance is the fact that the separate holder member provides additional protection for the housing against breakage due to destruction of the overvoltage protection device.

It is, therefore, one object of the present invention to provide an overvoltage protection apparatus having an improved housing requiring less mounting space and having a more tamper proof lock.

Another object of the invention is to provide such an apparatus in which the housing includes a tapered cover member and a tapered base member which slide along a guide slot that forms a more weather proof seal.

Still another object of the invention is to provide such a housing with a cam actuated lock means at the top portions of the cover and base members between the opposite side portions thereof.

A further object of the present invention is to provide such an apparatus with a separate holder member having the overvoltage device secured therein to enable easier insertion and removal of such device into and out of engagement with contacts on such base member while preventing electrical shock.

A still further object of the invention is to provide such a holder which protects the device during handling before assembly within the housing and prevents dust and other foreign matter from gathering on the electrical contacts.

An additional object of the invention is to provide such an apparatus in which the holder member is formed of a hollow container of transparent plastic insulating material to enable the device to be viewed within the holder member.

BRIEF DESCRIPTION OF THE DRAWINGS

Other objects and advantages of the present invention will be apparent from the following detailed description of a preferred embodiment thereof and from the attached drawings of which.

DESCRIPTION OF PREFERRED EMBODIMENT

Figure 1:
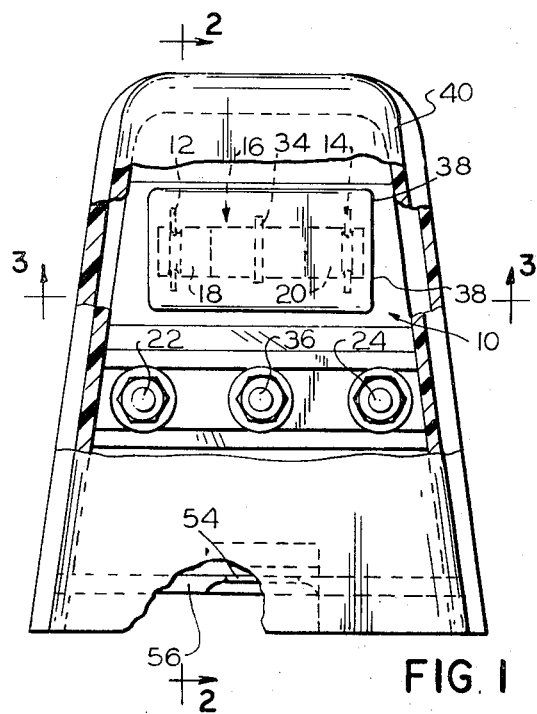
FIG. 1 is a plan view of the top of one embodiment of the overvoltage protection apparatus of the present invention with parts broken away for clarity.
Figure 2:
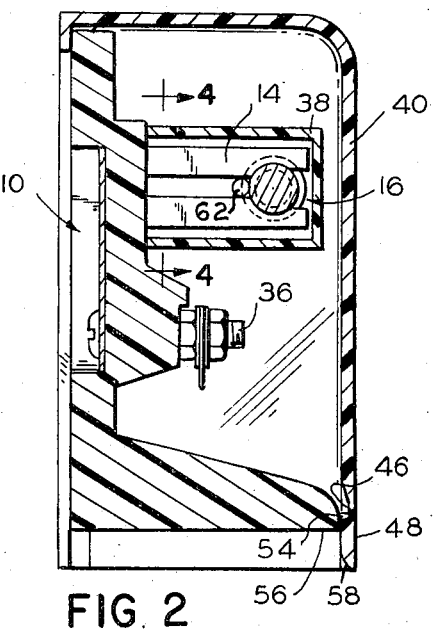
FIG. 2 is a vertical section view taken along the line 2—2 of FIG. 1.

As shown in FIGS. 1 and 2, one embodiment of the overvoltage protection apparatus of the present invention includes a base member 10 of electrical insulating material, such as rigid thermosetting plastic, having a pair of electrical contacts 12 and 14 fixed attached thereto. An overvoltage protection device 16 of the type shown in U.S. Pat. No. 3,535,582 of Chester Kawiecki, granted Oct. 20, 1970, is mounted on the base member 10 with its end terminals 18 and 20 in engagement with contacts 12 and 14. The contacts 12 and 14 are connected to the signal input and output terminals 22 and 24 which may be in the form of threaded studs having nuts thereon which are adapted to be connected to electrical wires in a cable extending through an opening 26 in the front end portion of the base member, such opening being filled by a rubber grommet 28 which is penetrated by the cable to provide a relatively water-tight seal. The overvoltage device 16 also includes a central ground electrode 30 which is connected to ground through a pair of spring biased mounting clips 32 engaging a fusible ring 34 surrounding such electrode and in contact therewith. The mounting clip 32 is attached to the base member 10 and connected to the ground terminal 36 in the form of a threaded stud and nut arrangement, which is attached to the ground wire of the connecting cable extending through opening 26.

The fusible ring 34 is of a low melting point metal alloy which fuses when the center electrode of the overvoltage device is heated to a sufficiently high temperature, due to a high breakdown current flowing between the end terminals 18 and 20 of the ground electrode 30, such as might be caused by a lightning strike, for example. When fusible ring 34 melts, a pair of opposite side projections 35 on each of the mounting clips 32 move inward into engagement with the end terminals 18 and 20 of the overvoltage protection device, thereby short-circuiting such end terminals to ground and providing a fail-safe operation.

The overvoltage protection device 16 is secured within a hollow holder member 38 of insulating material which may be a rectangular box of transparent plastic material, such as polycarbonate plastic, having an open bottom. This holder member 38 enables easier insertion and removal of the device 16 into and out of engagement with the contacts 12, 14 and mounting clips 32, while also preventing electrical shock. In addition, the holder member prevents dust or other foreign matter from accumulating on the contacts 12, 14 and mounting clips 32 and provides additional protection against breakage of the housing due to explosion of the overvoltage device. Furthermore, the holder member protects the overvoltage device 16 during handling, prior to assembly on the base member 10. As a result of being light transparent, the holder member enables the operator to observe the condition of the fusible ring member 34 to determine whether it must be replaced, without removing the device 16 from the contacts 12, 14 and 32 so that service is not interrupted.

Figure 6:
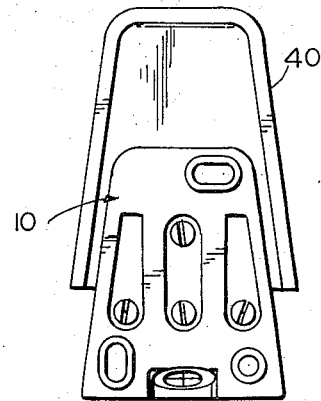
FIG. 6 is a plan view of the bottom of the housing of FIG. 1 with the cover and base member displaced from their locked position.

A cover member 40 of resilient thermoplastic material is releasably attached to the base member 10 to form therewith a closed housing containing the holder member 38 and the overvoltage protection device 16 therein. This cover member 40 is slidably secured to the base member by a guide means including a guide groove 42 extending around the inner surface of the bottom of the cover and a guide projection 44 extending around the outer edge of the base member 10. Thus, guide means 42 and 44 guide the sliding movement of the cover 40 relative to the base member 10 between the closed position of FIGS. 1 and 2, and the open position of FIG. 6. As shown in FIG. 6 the cover 40 and the base member 10 are of a tapered trapezoidal shape along the entire length so that the cover is freed from the base member to enable removal after it moves only about one-third the length of the base member, thereby requiring less mounting space.

Figure 5:
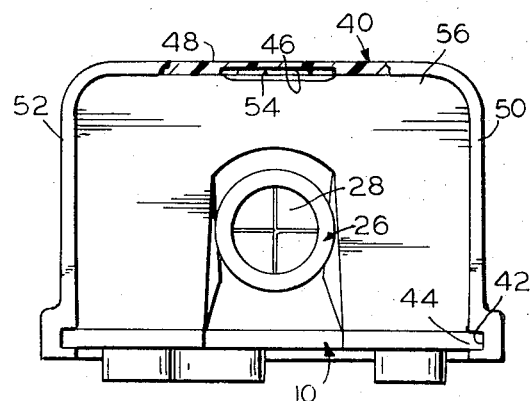
FIG. 5 is an elevation view of the lower end of the housing of FIG. 1 with parts broken away for clarity.

As shown in FIGS. 2 and 5, the cover 40 is locked to the base member 10 in the closed position by a locking notch 46 provided in the underside of a top portion 48 of the cover located between two downward extending side portions 50 and 52, and a locking projection 54 extending upwardly from a top portion 56 of the base member 10. The locking projection 54 engages a curved cam surface 58 on the under surface of the top portion 48 of the cover immediately in front of the locking notch 46, with the result that the top portion of the cover bends upwardly to enable the locking projection 54 to move into the notch 46. The cover is removed by inserting a small coin, screwdriver or other tool between the top portion 48 of the cover and the top portion 56 of the base member and then sliding the cover forward until the locking projection 54 disengages the notch 46 to unlock the cover. Removal of the unlocked cover is accomplished by sliding the cover forward into the position of FIG. 6, thereby disengaging the guide projection 44 from groove 42 so that the cover may be pulled away in a direction substantially perpendicular to the base member.

Figure 3:
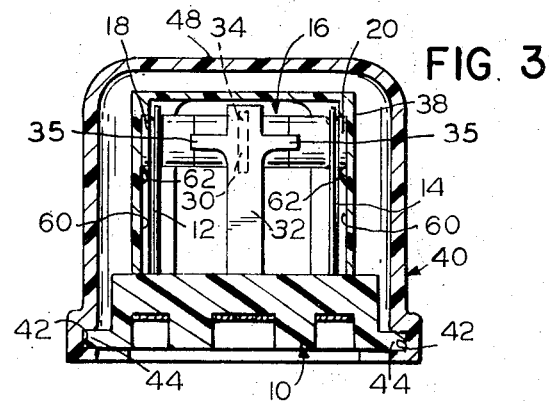
FIG. 3 is a horizontal section view taken along the line 3—3 of FIG. 1.
Figure 4:
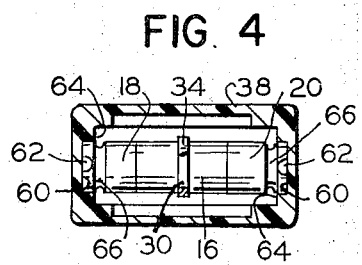
FIG. 4 is a vertical section view of the holder member taken along the line 4—4 of FIG. 2 with a portion of the fusible ring broken away for clarity.

As shown in FIGS. 3 and 4, the holder member 38 is provided with a pair of rectangular slots 60 at the opposite ends of the cavity therein for receipt of the end terminals 18 and 20 of the overvoltage device 16. This enables the device 16 to be slid into the holder member 38 along slots 60 until it snaps into a secured position between a pair of retaining bumps 62 and the upper ends of the slots. The retaining bumps 62 are molded into the surface of the slots 60 spaced from the upper ends of such slots a distance slightly greater than the diameter of the end terminals 18 and 20 and such bumps and slots provide a mounting means for the device 116 which is formed integral with the holder member 38. The holder member 38 is in the form of a rectangular box having an open bottom which fits over the electrical contacts 12 and 14 so that such contacts are guided by another pair of slots 64 of larger width than slot 60 into engagement with annular notches 66 on each end terminal 18 and 20 of the overvoltage device. At the same time, the fusible ring 34 attached to the central electrode 30 of the overvoltage device engages the spring biased mounting clips 32 which thereafter hold the device on the base member 10.

It will be obvious to those having ordinary skill in the art that many changes may be made in the details of the above-described preferred embodiment of the present invention without departing from the spirit of the invention. Therefore the scope of the present invention should only be determined by the following claims.

I claim:

1. An overvoltage protection apparatus in which the improvement comprises:

a base member of electrical insulating material;
 an overvoltage protection device mounted on said base member;
 a cover member releasably attached to said base member to form a housing containing said protection device in a closed position of said cover member, said cover member and said base member being of a tapered shape over substantially their entire length; and
 lock means for automatically locking said cover member to said base member when they are moved into said closed position; and
 guide means for guiding the sliding movement of said cover member along said base member between said closed position and an open position where the cover member is freed of the base member to enable removal of the cover member after said cover member slides over only a small portion of the entire length of said base member.

2. Apparatus in accordance with claim 1 which also includes a hollow holder member of electrical insulating material within which the protection device is secured, said holder member being provided within said housing to enable insertion and removal of said device into and out of contact with electrical connectors on said base member by movement of said holder member.

3. Apparatus in accordance with claim 2 in which said holder member is a container of transparent plastic material and said electrical connector extends through an opening in said container into contact with the protection device.

4. Apparatus in accordance with claim 1 in which said cover member and base member each have a top portion and side portions on opposite sides of said top portion, and said automatic lock means includes means provided on the top portions of said cover member and said base member for locking them together.

5. Apparatus in accordance with claim 4 in which said lock means includes a projection on the top portion of said base member and a notch on the top portion of said cover member into which said projection extends when the cover member is locked to said base member.

6. Apparatus in accordance with claim 5 in which the lock means includes a curved cam surface on said cover member adjacent said notch which is engaged by said projection as it slides into and out of said notch.

7. Apparatus in accordance with claim 4 in which said means also includes guide means provided on the side portions of said cover member and said base member for guiding the sliding movement of said cover member along said base member.

8. Apparatus in accordance with claim 1 in which said tapered shape enables said cover member to be freed from said base member in said open position before said cover member slides one-half the length of said base member.

9. An overvoltage protection apparatus in which the improvement comprises:
a base member of electrical insulating material having spaced electrical contact thereon;
an overvoltage protection device mounted on said base member in engagement with said contacts;
a cover member releasably attached to said base member so that said cover member slides along the length of said base member between an open position and a closed position to form a housing containing said protection device; and
a hollow holder member of electrical insulating material spearate from said cover member and having the protection device secured within said holder member by fixed holder means for holding said device to enable insertion and removal of said device into and out of engagement with said electrical contacts by movement of said holder member.

10. Apparatus in accordance with claim 9 in which said holder member is a container of transparent plastic material and said electrical connectors extend through an opening in said container into contact with the protection device.

11. Apparatus in accordance with claim 9 in which said holder member is a container enclosing said device and said holder means is formed integral with the holder member within said container.

12. Apparatus in accordance with claim 11 in which the mounting means includes a pair of slots extending inward from said opening along the opposite ends of said container, and the terminals of said device are held in said slots by retaining projections extending from the bottom of said slots.

13. Apparatus in accordance with claim 12 in which the terminals of said device are provided with notches for the receipt of external contacts inserted through the opening in said container, and said container is provided with guide surfaces along the opposite sides of each slot in alignment with said notches for guiding said contacts into said notches.

* * * * *